Figure 2:
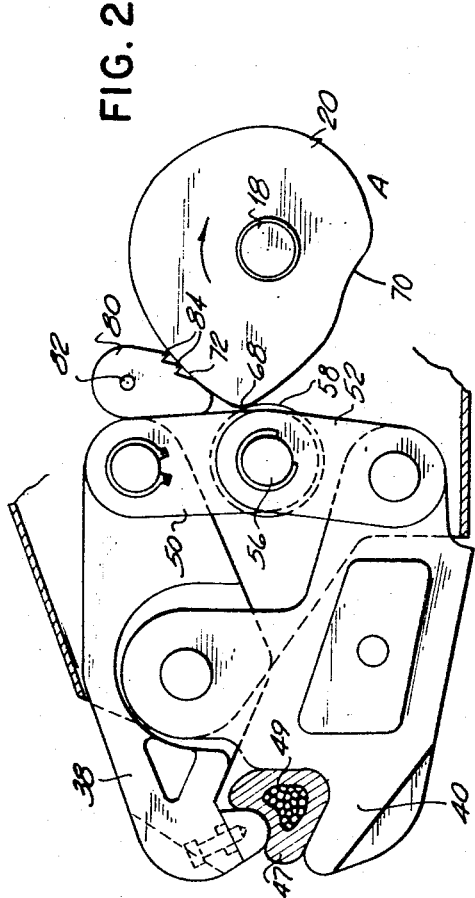

June 13, 1967

B. M. MALKIN 3,324,702

DAMPED COMPRESSION TOOL

Filed Jan. 19, 1965

INVENTOR.
Bruce M. Malkin
BY Howard L. Reiter
ATTORNEY

United States Patent Office 3,324,702
Patented June 13, 1967

3,324,702
DAMPED COMPRESSION TOOL
Bruce M. Malkin, Norwalk, Conn., assignor to Burndy Corporation, a corporation of New York
Filed Jan. 19, 1965, Ser. No. 426,531
7 Claims. (Cl. 72—409)

This invention relates generally to compression tools which employ a rotating cam as a force transmitting element. It relates particularly to an improved damping means for preventing undesired rotation of the cam in such a tool.

The general operation and design of the type of compression tool to which the present invention may be applied is fully and clearly described in previously issued United States Patent 3,101,017, issued Aug. 20, 1963, in which the present inventor is a co-inventor.

It has been found that in tools of the type described in the above-identified United States patent, the sudden release of stored energy at the end of a compression cycle tends to rotate the force transmitting cam part way through the next cycle. As a result, the position of the crimping jaws when the cam comes to rest may be somewhat less than fully opened. This in turn may cause considerable difficulty in removing a compressed connector and/or in inserting a fresh one prior to starting a new crimping cycle.

Previously devised brake or damping mechanisms for preventing this undesirable effect have generally involved the application of a continuous energy-dissipating load upon the rotating cam. Such damping mechanisms have the clear disadvantage of requiring increased energy input on the part of the operator to simultaneously overcome both the damping and the crimping forces.

Accordingly, it is an object of this invention to provide a damping mechanism for a compression tool of the type described, which applies retarding forces to the cam during only a part of each cycle of the tool.

Still another object is the provision of such a damping mechanism having a minimum of parts, but which is nevertheless highly effective, and which is extremely simple and inexpensive to produce and install.

A feature of this invention is the combination with a rotating cam and a toggle-linkage cam-follower, of a wedge-like shim element positioned and dimensioned to interfere between the rotating cam and the cam-follower linkage at a given point during a cam revolution so as to shift the effective point at which force is transmitted from the linkage to the cam. The wedge element thus described serves to retard rotation of the cam which would otherwise be caused by reverse transmission of forces from the follower linkage acting against a descending, or "return," portion of the cam.

Figure 1:
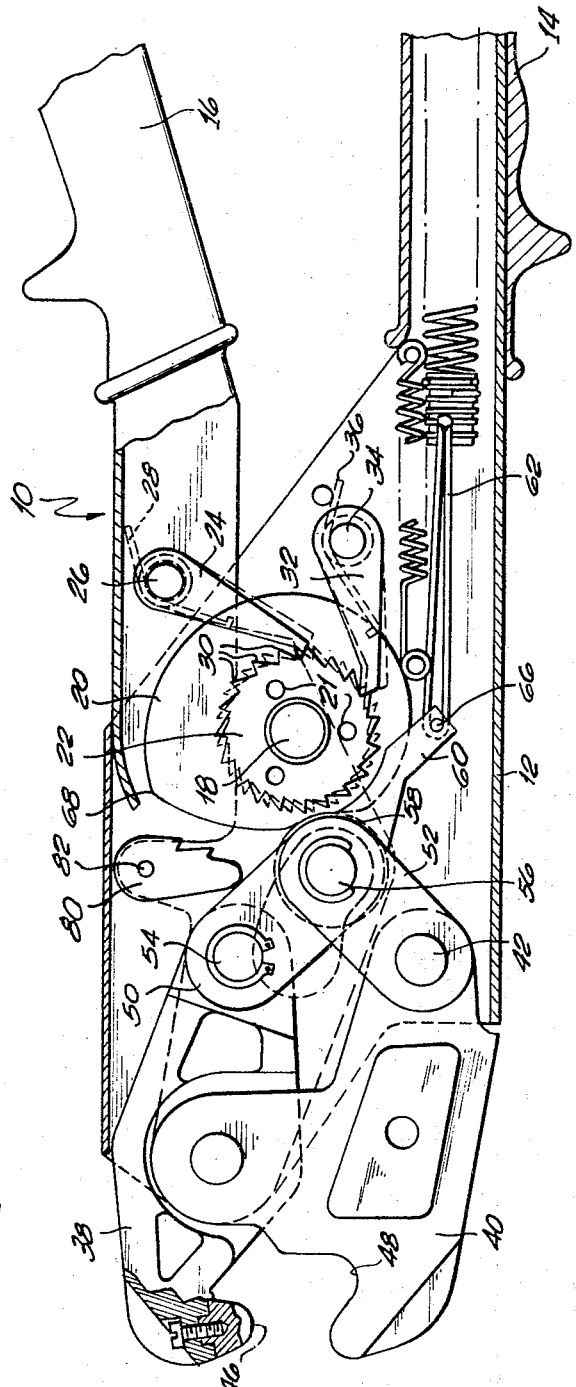

These and other objects and features of this invention are accomplished and new results obtained, as will be apparent from consideration of the device which is described in the following specification, particularly pointed out in the claims, and illustrated in the accompanying drawing, in which:

FIG. 1 is a partially cut away side elevation view of a compression tool to which this invention applies, shown with the customary external cover removed to illustrate the working mechanism; and FIG. 2 is a partial side elevation view of the tool of FIG. 1 showing the damping mechanism of this invention in operation at the very end point of a compression cycle.

As described in United States Patent 3,101,017, the multiple stroke tool identified generally by reference numeral 10 in FIG. 1 comprises a body element 12 which terminates at one end in a handle portion 14. Associated therewith is a movable handle element 16 which is pivotally mounted on the body at the pin 18; also mounted to the pin 18 is the cam 20. The cam is fixed by pins 21 to a ratchet wheel 22 which is driven by a pawl 24 mounted on the movable handle 16 at pin 26. A spring 28 urges the pawl into contact with the ratchet teeth 30.

The holding pawl 32 also engages the teeth 30 to lock the cam at the end of each stroke and is supported to the body by pin 34. A spring 36 similarly urges the holding pawl 32 into contact with ratchet teeth 30.

At the other end of the tool there is located a pair of toggle-connected jaws 38 and 40. The stationary jaw 40 is supported to the body by pins 42 and 44, the latter of which acts as a pivot pin for movable jaw 38.

The jaws 38 and 40 terminate in an indentor 46 and a groove 48, respectively, for receiving and indenting the tubular barrel portion of a connector 47 to an electrical conductor 49. It is considered obvious that many forms of compression jaws and indentor elements may be provided on this tool without affecting the substance of this invention.

Jaws 38 and 40 are each connected at one end, to toggle links 50 and 52 by means of pins 54 and 42 respectively. The links are pivotally joined to each other at pin 56 which also supports the roller follower 58 in contact with cam 20. Toggle link 50 extends beyond pin 56 to form an arm 60 which is connected to a tension spring 62; the spring is anchored to the body 12 at hook 64 and to the arm 60 by pins 66. The pring tension thus serves to urge roller follower 58 to tend toward and continuously engage the cam.

The cam is provided with a spirally increasing radius which engages follower 58 as the cam rotates clockwise about pin 18 in FIG. 1. At the point of maximum radius 68 on the cam, the toggle mechanism has fully closed the indentor jaws. When the cam has rotated past engagement of maximum point 68 with follower 58 and falls to engagement of the follower with the starting position, point 70 (as shown in FIG. 1), the jaws are automatically opened. Opening is accomplished by the force of spring 62 acting on arm 60 in order to permit removal of the crimped connector and insertion of a fresh one.

The mechanism described above characteristically develops exceptionally high compression forces for indenting a connector on to a conductor. In turn, the fully compressed connector (as shown in FIG. 2) tends to store some of the applied energy in the manner of a spring. At the very end of the compression portion of the tool cycle, as cam follower 58 is positioned just slightly past the maximum radius point 68 of the cam, the energy stored in the compressed connector 47 is transmitted back through jaws 38 and 40 and toggle links 50 and 52, tending to forceably drive the cam follower 58 along the descending or return portion of the cam face between points 68 and 70.

In addition to the damage to the cam, follower, and related joints and couplings often caused by the impact forces thus developed, this sudden release of energy tends to cause the cam follower 58 to drive the cam 20 in a clockwise direction somewhat past the normal end-of-cycle position shown in FIG. 1. The result of this overdriving of the cam is that the follower 58 comes to rest at a point indicated generally by A in FIG. 2; point A may be seen to be spaced significantly past the low point 70 of the cam so that the jaws 38 and 40 are again partially closed. For all of the foregoing reasons, the sudden uncontrolled release of energy stored in a compressed connector at the end of a compression cycle in the illustrated tool, is considered highly undesirable. This invention contemplates the use of a wedge-shaped brake element 80 which is pivotally supported to the body 12 by pin 82, to control the release of stored energy at the end of a compression cycle. The element 80 is dimensioned and positioned on the body 12 so as to be forceably urged against toggle link 50 by engagement with maximum-force surface portion 72 of cam 20 when the high point 68 of the cam is rotated past cam follower 58. The brake element thus controls the usual end-of-cycle release of energy by wedgingly resisting continued clockwise motion of cam 20. Further, by wedging the brake against toggle link 50, the force from the toggle link is transmitted to the cam at a point which tends to rotate the cam in a counterclockwise direction. That is, the effective point of contact between the cam and the follower linkage is shifted ahead in the direction of cam rotation.

Element 80 is preferably formed of a tough, stiffly resilient and long wearing material such as relatively hard polyurethane. A plurality of friction teeth 84 may be provided on the cam-engaging surface of the brake element to improve its engagement with, and rotation-retarding effect on, the cam.

As may be seen in FIG. 2, the wedge action of element 80 acts to substantially disengage follower 58 from the cam surface for at least a portion of its travel between high point 68 and low point 70. Reverse force transmission through follower 58 to the descending portion of the cam 20 is thus substantially prevented or at least significantly reduced during rotation through at least part of the cam rotation. Moreover, by shifting the effective point of force transmission ahead to an ascending portion of the cam face, the forces which are transmitted from the linkage to the cam during this part of the cam rotation are applied in a direction tending to maintain a counter-rotational load on the cam. These forces are transmitted through element 80 from link 50.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

I claim:

1. A compression force applying tool, comprising: a frame; a movable jaw coupled to said frame; a pivot linkage coupled to said frame and said jaw for actuating said jaw; a cam follower on said linkage; a rotatable cam for actuating said linkage; means for rotating said cam; a first surface portion on said cam for engaging said follower and moving said linkage in one direction as said first surface is rotated past a fixed point on said frame; a second surface portion on said cam for permitting said follower and said linkage to move in a substantially opposite direction as said second surface is rotated past said fixed point; and, means for substantially disengaging said cam follower from said second surface while said second surface is rotated past said fixed point, to substantially prevent transmission of force from said cam follower to said second surface during rotation of at least a portion of said second surface past said follower.

2. A compression force applying tool in accordance with claim 1 wherein said means for substantially disengaging said cam follower from said second surface includes a wedge element coupled to said frame in position to be urged against said linkage by said cam first surface as said cam follower approaches said second surface.

3. A compression force applying tool in accordance with claim 2 wherein said wedge element is formed with a substantially wedge-shaped cross-section and is pivotally mounted to said frame.

4. A compression tool in accordance with claim 2 wherein said wedge element is formed of a stiffly resilient material.

5. A compression tool in accordance with claim 2 wherein said wedge element includes a gripper surface of substantially resilient material adapted to engage said cam first surface for resisting normal rotation of said cam.

6. A compression force applying tool, comprising: a frame; a movable jaw coupled to said frame; a pivot linkage including a cam follower portion for actuating said jaw; a rotatable cam for actuating said linkage; means for rotating said cam in a given direction; an ascending cam surface on said cam; a descending cam surface on said cam; said cam being adapted to transmit compressive force to said jaw through said cam follower portion during rotation of said ascending cam surface past said cam follower; said cam being further adapted to permit release of compression forces on said jaw during rotation of said descending cam surface past said cam follower; and, means on said tool adapted to interfere between said follower linkage and said ascending cam surface during rotation of at least part of said descending surface past said cam follower to urge said follower away from said cam, whereby transmission of force from said follower portion to said descending cam surface during opening of said jaw is substantially prevented.

7. A compression force applying tool of the type having a movable jaw operable through a full cycle in which said jaw is progressively closed against another during one part of said cycle and is permitted to open during another part of said cycle, said tool comprising: a frame; a movable jaw coupled to said frame; means coupled to said frame for moving said movable jaw, including a unidirectional rotary cam and a cam follower linkage; said rotary cam including an ascending portion and a descending portion, and said linkage including a cam-engaging portion; said means for moving said movable jaw being adapted to close said jaw during rotation of said cam ascending portion past a given point relative to said frame, and to permit said jaw to open during rotation of said descending portion past said given point; and, means to hold said cam engaging portion away from said cam descending portion during rotation of at least part of said descending portion past said given point.

References Cited
UNITED STATES PATENTS 3,101,017  9/1963  Malkin et al. _____ 72—409

CHARLES W. LANHAM, *Primary Examiner.*

R. D. GREFE, *Assistant Examiner.*